United States Patent
Kobayashi et al.

(10) Patent No.: US 9,954,378 B2
(45) Date of Patent: Apr. 24, 2018

(54) METHOD AND PROGRAM FOR CONTROLLING POWER STORAGE SYSTEM AND STORAGE BATTERY

(71) Applicant: NEC Corporation, Tokyo (JP)

(72) Inventors: Kenji Kobayashi, Tokyo (JP); Yuan Luo, Tokyo (JP); Junichi Miyamoto, Tokyo (JP); Shingo Takahashi, Tokyo (JP); Nobuhide Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 124 days.

(21) Appl. No.: 14/915,119

(22) PCT Filed: Jun. 26, 2014

(86) PCT No.: PCT/JP2014/066949
§ 371 (c)(1),
(2) Date: Feb. 26, 2016

(87) PCT Pub. No.: WO2015/029568
PCT Pub. Date: Mar. 5, 2015

(65) Prior Publication Data
US 2016/0211677 A1     Jul. 21, 2016

(30) Foreign Application Priority Data

Aug. 28, 2013   (JP) ................................ 2013-177236

(51) Int. Cl.
*H02J 7/00*         (2006.01)
(52) U.S. Cl.
CPC .......... *H02J 7/0014* (2013.01); *H02J 7/0021* (2013.01); *H02J 7/0026* (2013.01)

(58) Field of Classification Search
CPC ............................ H02J 7/0014; H02J 7/0021
(Continued)

(56) References Cited

U.S. PATENT DOCUMENTS 9,071,056 B2 *   6/2015   Yang et al. ........... H02J 7/0016
9,496,730 B2 *  11/2016   Gallegos et al. ..... B60L 3/0046
(Continued)

FOREIGN PATENT DOCUMENTS

JP      2001-145273 A      5/2001
JP      2006-211885        8/2006
(Continued)

OTHER PUBLICATIONS

International Search Report and Written Opinion dated Aug. 26, 2014 in corresponding PCT International Application.
(Continued)

*Primary Examiner* — Sun Lin
(74) *Attorney, Agent, or Firm* — Finnegan, Henderson, Farabow, Garrett & Dunner, L.L.P.

(57) ABSTRACT

A power storage system comprises the following: a battery unit in which a plurality of battery cells are connected; an acquisition unit for continuously acquiring, while the battery unit is discharging, (V) which represents the extent of the discharge from the battery unit and the temperature (T) of the battery unit when the degree of discharge is (V); a balancing unit for executing cell balancing by which a difference in amount of charging between battery cells is reduced; and a balancing control unit for controlling the balancing unit so that when a reference state is detected based on (V) and (T), cell balancing is not executed, in accordance with a result of the detected reference state.

6 Claims, 8 Drawing Sheets

(58) Field of Classification Search
 USPC .......................................................... 320/118
 See application file for complete search history.

(56) References Cited

U.S. PATENT DOCUMENTS

| | | | |
|---|---|---|---|
| 9,673,640 B2* | 6/2017 | Kudo et al. ........... | H02J 7/0016 |
| 2006/0139004 A1 | 6/2006 | Uesugi et al. | |
| 2006/0238165 A1* | 10/2006 | Moore et al. ......... | H02J 7/0016 |
| | | | 320/118 |
| 2010/0190041 A1* | 7/2010 | Hou et al. ........... | H01M 10/482 |
| | | | 429/50 |
| 2011/0121785 A1 | 5/2011 | Iida et al. | |
| 2012/0274283 A1* | 11/2012 | van Lammeren ... | B60L 11/1866 |
| | | | 320/118 |
| 2014/0327400 A1* | 11/2014 | Kudo et al. ........... | H02J 7/0016 |
| | | | 320/118 |

FOREIGN PATENT DOCUMENTS

| | | |
|---|---|---|
| JP | 2008-236991 A | 10/2008 |
| JP | 2010-35392 | 2/2010 |
| JP | 2013-5678 | 1/2013 |
| WO | WO 2013/128809 A1 | 9/2013 |

OTHER PUBLICATIONS

Notification of Reasons for Refusal issued by Japanese Patent Office in counterpart Japanese Patent Application No. 2015-534053, dated Dec. 26, 2017.

* cited by examiner

METHOD AND PROGRAM FOR CONTROLLING POWER STORAGE SYSTEM AND STORAGE BATTERY

CROSS-REFERENCE TO RELATED PATENT APPLICATIONS

This application is a National Stage Entry of International Application No. PCT/JP2014/066949, filed Jun. 26, 2014, which claims priority from Japanese Patent Application No. 2013-177236, filed Aug. 28, 2013. The entire contents of the above-referenced applications are expressly incorporated herein by reference.

TECHNICAL FIELD

The present invention relates to a method and a program for controlling a power storage system and a storage battery.

RELATED ART

Published patent application No. 2013-5678 discloses a cell balance control device provided with a cell balancing circuit. The cell balance control device is a cell balance control device which controls a plurality of chargeable battery cells connected in series in a battery. The cell balance control device comprises a voltage detection means which detects a voltage of each of the battery cells, a temperature detection means which detects a temperature of the battery, a threshold value determination means which determines a threshold value voltage on the basis of the battery temperature detected by the temperature detection means, and a cell balancing circuit which causes current to flow from a battery cell having a voltage higher than the threshold value among the battery cells to a battery cell having a voltage lower than the threshold value voltage among the battery cells.

CITATION LIST

Patent Literature

Patent Literature 1: Published patent application No. 2013-5678

SUMMARY OF INVENTION

Technical Problem

Generally, a secondary battery in which a plurality of battery cells are connected stops discharging when the charge amount of at least one of the battery cells reaches a certain level or below even when electric power remains in the other battery cells. The effective capacity of the battery can be increased by so-called executing active cell balancing. In active cell balancing, a battery cell having a large charge amount supplies electric power to a battery cell having a small charge amount. However, electric power is consumed even by execution of cell balancing. When excessive cell balancing is executed, the effective capacity of the battery may be lowered by electric power consumption due to execution of cell balancing.

An object of the invention of the present application is to provide a technique for increasing the effective capacity of a battery.

Solution to Problem

Advantageous Effect of Invention

According to the invention, a technique for increasing the effective capacity of a battery is implemented.

BRIEF DESCRIPTION OF DRAWINGS

The object described above and other objects, features and advantages of the present invention will become more apparent by the following description of a preferred exemplary embodiment along with the accompanying drawings.

DESCRIPTION OF EMBODIMENTS

In the following, an exemplary embodiment of the invention is described using the drawings. The same constituent elements are indicated with the same reference signs, and repeated description thereof is omitted as necessary.

A power storage system of the exemplary embodiment is implemented by a CPU (Central Processing Unit) of any computer, a memory, a program loaded in a memory (including a program stored in a memory at the time of shipment of devices, and a program downloaded from a storage medium such as a CD (Compact Disc) or from a server on the Internet), a storage unit such as a hard disk which stores the program, and any combination of hardware and software through an interface to be connected to a network. A person skilled in the art should appreciate that a variety of modifications are available regarding the method and the device for implementing the above.

Further, the functional block diagrams used in describing the exemplary embodiment do not illustrate a configuration by hardware units, but illustrate blocks by functional units. The system and the device is not limited to the above although each of the system and the device is implemented by one apparatus in these figures. In other words, any configuration is available including physically separated units and logically separated units.

First, the concept of the exemplary embodiment is described. As a result of extensive research and development of a power storage system in which a plurality of battery cells are connected, the inventors found that there is a specific relationship between the degree of discharge during discharging from the power storage system and a temperature T of a battery when the degree of discharge is at V. The degree of discharge is indicated as (V).

Figure 4:
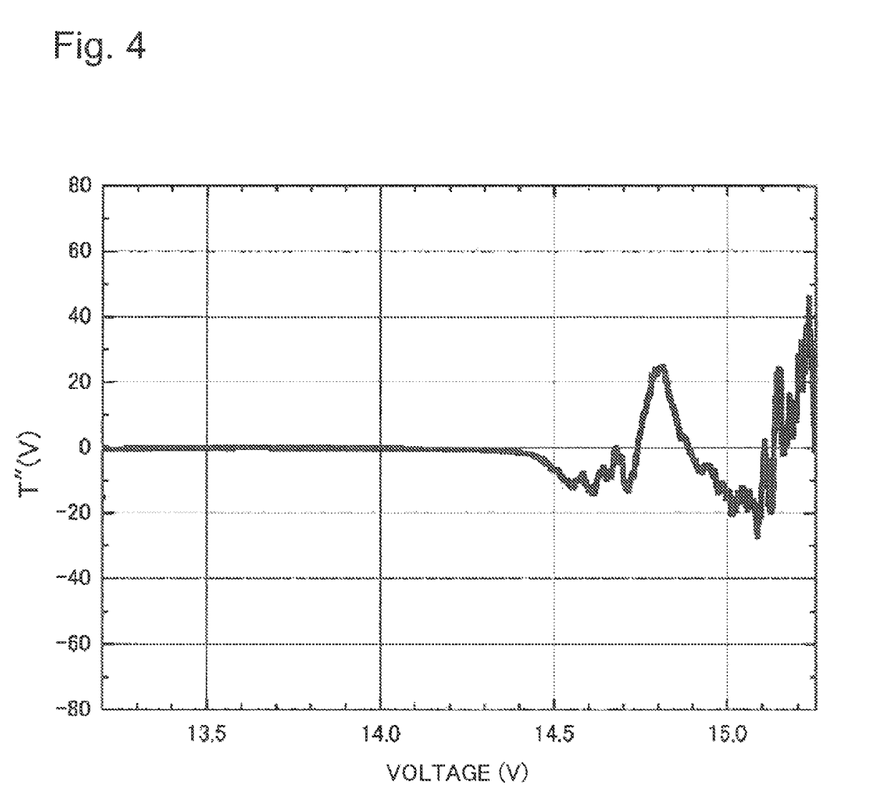
FIG. 4 is a diagram for describing the advantageous effects of the exemplary embodiment.
Figure 8:
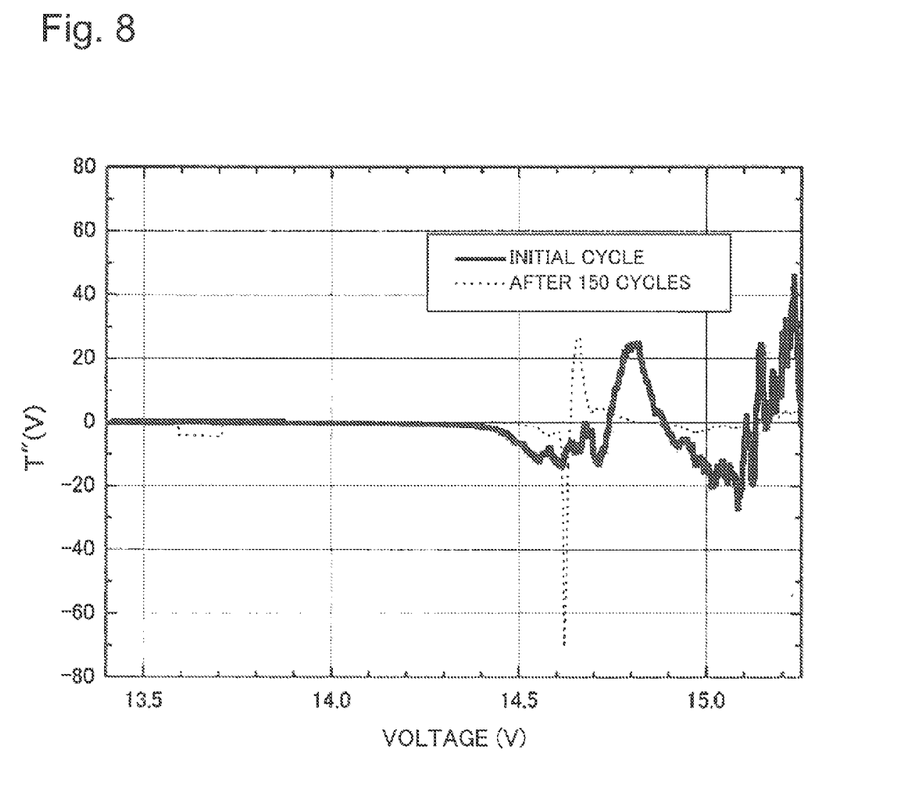
FIG. 8 is a diagram for describing the advantageous effects of the exemplary embodiment.

The specific relationship is described using FIG. 4 and FIG. 8. FIG. 4 and FIG. 8 illustrate a twice differentiation curve representing a change in the temperature of a battery module with respect to lowering of a charging voltage of the battery module in a discharge operation. The horizontal axis denotes a charging voltage (a remaining voltage) V of a battery module and the vertical axis denotes a twice differentiated value of a function T (V) of V, which is calculated (derived) from V and T. V decreases as discharge progresses. Therefore, it is clear that a twice differentiated value of T (V) shifts from right to left in the drawings, as discharge progresses. FIG. 4 illustrates measurement data at the first charging and discharging cycle. FIG. 8 illustrates measurement data at the first charging and discharging cycle (initial cycle), and measurement data (after 150 cycles) after 150 cycles in an overlapped state. The method for obtaining measurement data is described later in the section of examples.

FIG. 4 illustrates a distinctive tendency that a twice differentiate value of T(V) greatly changes until a period from start of discharging, but converges to zero thereafter at the first charging and discharging cycle. FIG. 8 also illustrates the same distinctive tendency as described above after 150 cycles.

The inventors found that the effective capacity can be increased by using the specific relationship and controlling cell balancing is executed until a twice differentiated value of T (V) converges, and cell balancing is not executed after the twice differentiated value of T (V) converges. The details are described later in the section of examples. In the following, an exemplary embodiment of the invention is described based on the aforementioned finding.

Figure 1:
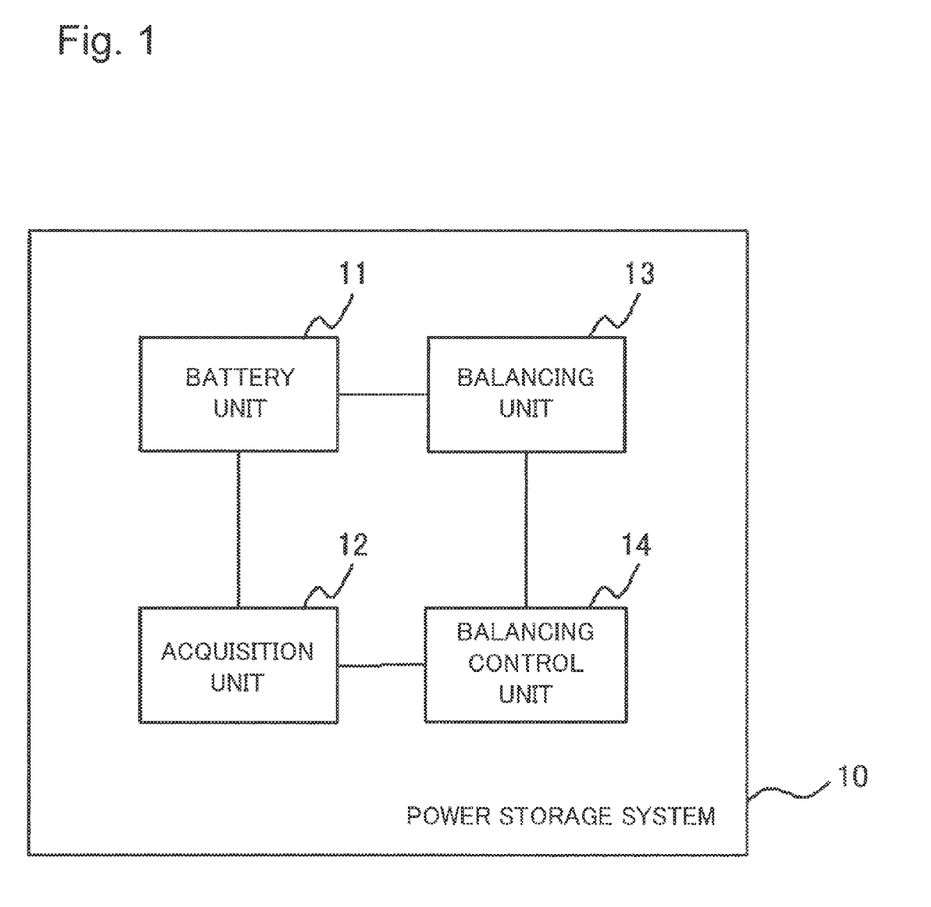
FIG. 1 is a diagram conceptually illustrating an example of a functional block diagram of a power storage system of an exemplary embodiment.

FIG. 1 illustrates an example of a functional block diagram of a power storage system 10 of the exemplary embodiment. As illustrated, the power storage system 10 includes a battery unit 11, an acquisition unit 12, a balancing unit 13, and a balancing control unit 14. Although not illustrated, the power storage system 10 may comprise an inverter for connecting to an alternate current circuit, and a transformer for distributing direct current.

For example the power storage system 10 may be a stationary power storage system 10. For example, the stationary power storage system 10 repeats a cycle of charging to a certain level (e.g. to a certain SOC (State of Charge) level) and discharging, and then charging again to a certain level (e.g. to a certain SOC (State of Charge) level) and discharging. For example, the power storage system 10 repeats a cycle of charging to a certain level in nighttime in which the electricity price is low, and discharging in daytime.

The battery unit 11 is configured that the plurality of battery cells (e.g. lithium-ion secondary battery cells) are connected in series and/or in parallel. The number of battery cells is a design matter. The battery unit 11 may include a charge/discharge control unit. The charge/discharge control unit controls charge to the plurality of battery cells and discharge from the plurality of battery cells.

The acquisition unit 12 acquires information representing a state of the battery unit 11. For example, the acquisition unit 12 acquires information (e.g. SOC) representing a charge state of the entirety of the battery unit 11 and of each of the battery cells, information representing a discharge amount from the entirety of the battery unit 11 and from each of the battery cells, information representing a temperature of the entirety of the battery unit 11 and of each of the battery cells, and the like. Means by which the acquisition unit 12 acquires these information items is not specifically limited, and any available technique may be employed.

The acquisition unit 12 continuously acquires V representing a degree of discharge from the battery unit 11, and a temperature T of the battery unit 11 in the cases where the degree of discharge is V while discharging the battery unit 11. The time interval at which data is acquired is a design matter. V representing a degree of discharge may be a discharge amount (e.g. a total discharge amount from a discharge start time) itself, or may be a charge amount (e.g. SOC) remaining in the battery unit 11. In the latter case, comparing a charge amount at a certain time (e.g. at a discharge start time) and a charge amount at a current time makes it possible to know a degree of discharge from the certain time (e.g. from the discharge start time).

V and T are synchronized by using any means. For instance, the acquisition unit 12 may respectively acquire V and T by associating V and T with time information such as an elapsed time from a discharge start time or a current time. In this case, V and T are synchronized via the time information. The acquisition unit 12 is capable of acquiring V and T on a real-time basis.

The balancing unit 13 executes cell balancing for reducing a difference of the charge amount between battery cells. The cell balancing may be active cell balancing in which the charge amount is supplied between the pluralities of battery cells by using a capacitor. The balancing unit 13 includes a cell balancing circuit. The balancing unit 13 executes cell balancing in the cases where the balance of the charge amount between battery cells is collapsed to a reference level (which is a design matter). Specifically, in the cases where the balance of the charge amount between battery cells is collapsed to a reference level, the balancing unit 13 controls the cell balancing circuit to connect battery cells to each other for transferring electric power between the connected battery cells. The balancing unit 13 can execute cell balancing while discharging the battery unit 11. The balancing unit 13 may execute cell balancing while discharging the battery unit 11.

The effective capacity of the battery unit 11 can be increased by executing cell balancing executed by the balancing unit 13. However, the execution of cell balancing consumes electric power. Therefore, excessive execution of cell balancing may reduce the effective capacity of the battery unit 11 by electric power consumption due to execution of cell balancing.

In view of the above, the balancing unit 13 includes a mode in which a cell balancing operation is executed, and a mode in which a cell balancing operation is not executed. When a cell balancing operation is performed, the balancing unit 13 executes cell balancing in the cases where the balance of the charge amount between battery cells is collapsed to a reference level. On the other hand, when a cell balancing operation is not executed, the balancing unit 13 does not execute cell balancing in the cases where the balance of the charge amount between battery cells is collapsed to a reference level. In the exemplary embodiment, the effective capacity of the battery unit 11 can be increased by switching ON/OFF of a cell balancing operation appropriately.

The balancing control unit 14 detects a timing at which the balancing unit 13 is controlled not to execute cell balancing on the basis of V and T acquired by the acquisition unit 12, in other words, a timing at which the balancing unit 13 operates in a mode in which a cell balancing operation is not executed. In response to detection of the timing, the balancing control unit 14 controls the balancing unit 13 not to execute cell balancing (to operate the balancing unit 13 in the mode in which a cell balancing operation is not executed) thereafter.

For instance, in response to detection of a state that a twice differentiated value of T (V), which is a function (e.g. an approximation function) of V to be derived using V and T acquired by the acquisition unit 12, satisfies a certain condition after discharge from the battery unit 11 is started for instance, the balancing control unit 14 controls the balancing unit 13 not to execute cell balancing thereafter.

For instance, the certain condition is a condition at which a twice differentiated value of T (V) is converged to 0 (zero). The certain condition may be a condition at which the absolute value of a twice differentiated value of T (V) is converged to a certain value (0+α) or smaller. Converging is a state that a certain state (e.g. a state that a twice differentiated value of T(V) keeps 0 for a certain period (which is a design matter). Conversing may be a state that the absolute value of a twice differentiated value of T(V) keeps a certain value or smaller) for the certain period.

The effective capacity of the battery unit 11 can be increased by aforementioned control by the balancing control unit 14. The details are described later in the section of examples.

Means for judging whether the aforementioned certain condition is satisfied is not specifically limited. For instance, the balancing control unit 14 calculates a twice differentiated value of T (V) in the real time, using V and T acquired by the acquisition unit 12 in the real time. Thereafter, the balancing control unit 14 judges whether the calculated value reaches a certain value (e.g. 0, or a state that the absolute value of the calculated value is a predetermined value or smaller). When the calculated value reaches the certain value, the balancing control unit 14 judges whether a state that the twice differentiated value of T (V) reaches the certain value (e.g. 0, or a state that the absolute value of the calculated value is a certain value or smaller) is continued for a certain period, taking into consideration the preceding judgment result. For instance, the balancing control unit 14 can judge whether the certain condition is satisfied by the aforementioned flow. This is merely an example, and the exemplary embodiment is not limited to the above. For instance, the balancing control unit 14 may track a change in a once differentiated value of T (V), and may detect a state that a twice differentiated value converges to 0 (zero) (a state that a once differentiated value does not change any longer), or a state that the absolute value of a twice differentiated value converges to a certain value (0+α) or smaller (a state that a once differentiated value does not change by a certain level or more).

Figure 2:
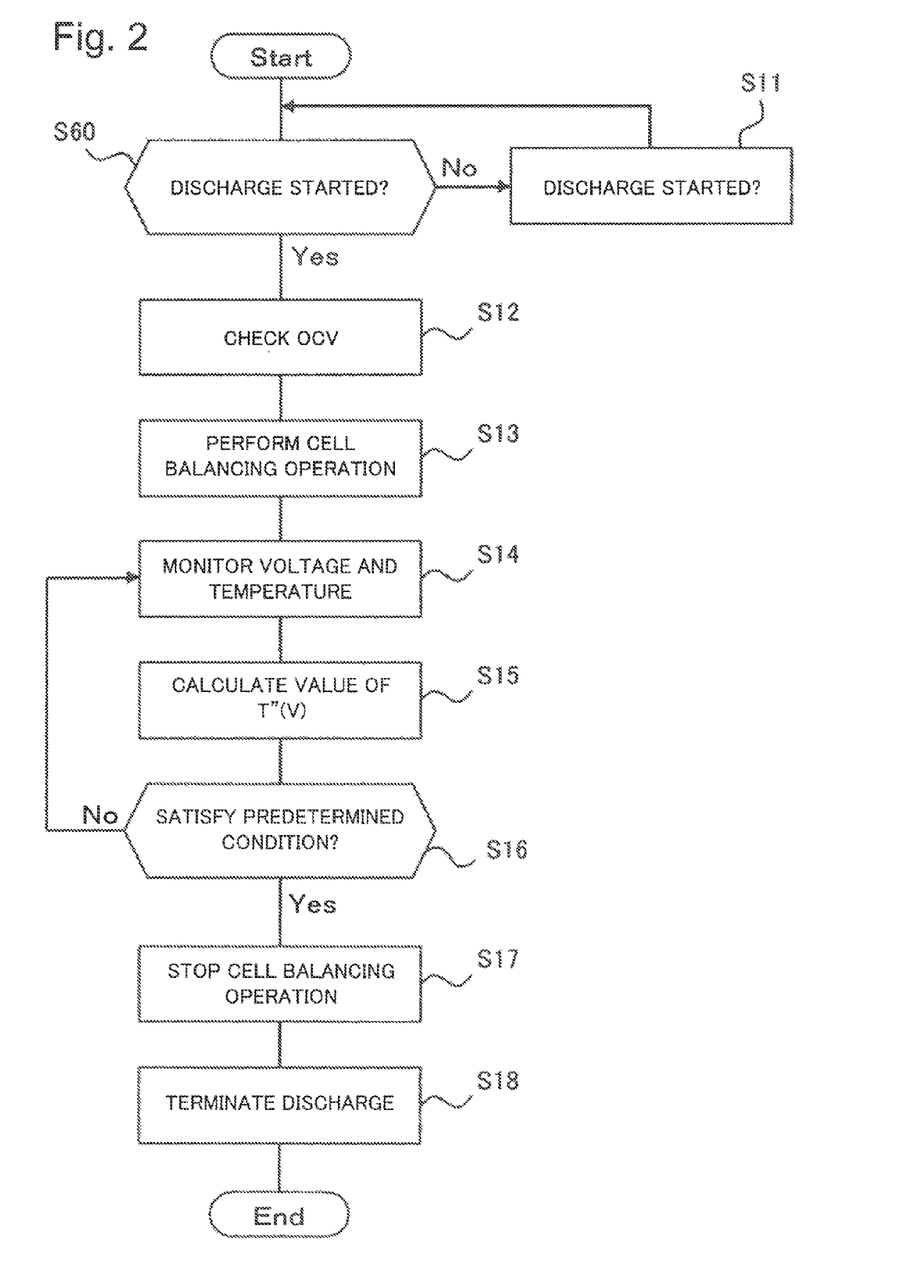
FIG. 2 is a flowchart illustrating an example of a flow of operations to be performed by the power storage system of the exemplary embodiment.

Next, an example of a flow of operations to be performed by the power storage system 10 in the exemplary embodiment is described using the flowchart of FIG. 2.

The power storage system 10 is brought to a discharge start standby state after charging the battery unit 11 to a certain level (which is a design matter, for instance, to a level such that SOC is 100%) (S10). Until discharge is started (No in S10), the discharge start standby mode is continued (S11).

Subsequently, the power storage system 10 starts discharge at a certain timing (e.g. a timing at which the user inputs a command to start discharge, a timing at which discharge is to be started, or a timing at which a load is started to operate) (Yes in S10). When discharge is started, the power storage system 10 checks the OCV (Open Circuit Voltage) (S12) first, and thereafter, starts discharge at constant electric power.

The balancing unit 13 starts a cell balancing operation at certain timing after discharge is started (S13). For instance, the balancing unit 13 starts a cell balancing operation in response to discharge start. The balancing unit 13 executes cell balancing in the cases where the balance of the charge amount between battery cells is collapsed to a reference level during a cell balancing operation.

Subsequently, the acquisition unit 12 continuously acquires V representing a degree of discharge from the battery unit 11, and a temperature T of the battery unit 11 when the degree of discharge is V on a real-time basis while discharging the battery unit 11 (S14).

The balancing control unit 14 calculates a twice differentiated value of T (V), which is a function (e.g. an approximation function) of V to be derived using V and T on a real-time basis by using V and T acquired by the acquisition unit 12 in S14 (S15). The balancing control unit 14 may calculate a twice differentiated value of T (V) with use of all data of V and T acquired by the acquisition unit 12 in S14. Alternatively, the balancing control unit 14 may calculate a twice differentiated value of T (V) with use of every other number of data. Preferably, the differentiation interval may be such that a voltage change amount of a single cell is 10 mV or smaller (not shorter than 1 minute but not longer than 5 minutes in terms of time).

Thereafter, in S16, the balancing control unit 14 judges whether the twice differentiated value of T (V) satisfies a certain condition. For instance, the balancing control unit 14 judges whether the absolute value of the twice differentiated value of T(V) converges to a certain value (0+α) or smaller.

When the judgment result in S16 is "satisfy the certain condition" (Yes in S16), the balancing control unit 14 controls the balancing unit 13 not to execute cell balancing thereafter (S17). Then, the balancing unit 13 stops the cell balancing operation. Thereafter, the balancing unit 13 does not execute cell balancing, even when the balance of the charge amount between battery cells is collapsed to a reference level.

On the other hand, when the judgment result in S16 is "does not satisfy the certain condition" (No in S16), the acquisition unit 12 and the balancing control unit 14 continue to perform S14 to S16. During S14 to S16 are performed, the balancing unit 13 continues the cell balancing operation. Specifically, when the balance of the charge amount between battery cells is collapsed to a reference level, the balancing unit 13 executes cell balancing.

Thereafter, when at least one of the charge amounts of the battery cells falls to a reference level or below, the power storage system 10 stops discharge (S18), and terminates the operation. As will be described later in the section of examples, even if the power storage system 10 repeats charging and discharging a plurality of times, the value (V1) of V when a twice differentiated value of T (V) satisfies the aforementioned condition hardly changes. In view of the above, it is possible to determine whether a twice differentiated value of T (V) satisfies the aforementioned condition by determining whether the value of V satisfies V1 in place of executing S15 after the value of Vi is specifies by charging, discharging and executing the aforementioned measurement.

Embodiments

Next, the advantageous effects of the exemplary embodiment are described by examples.

<Configuration of Power Storage System>

Figure 3:
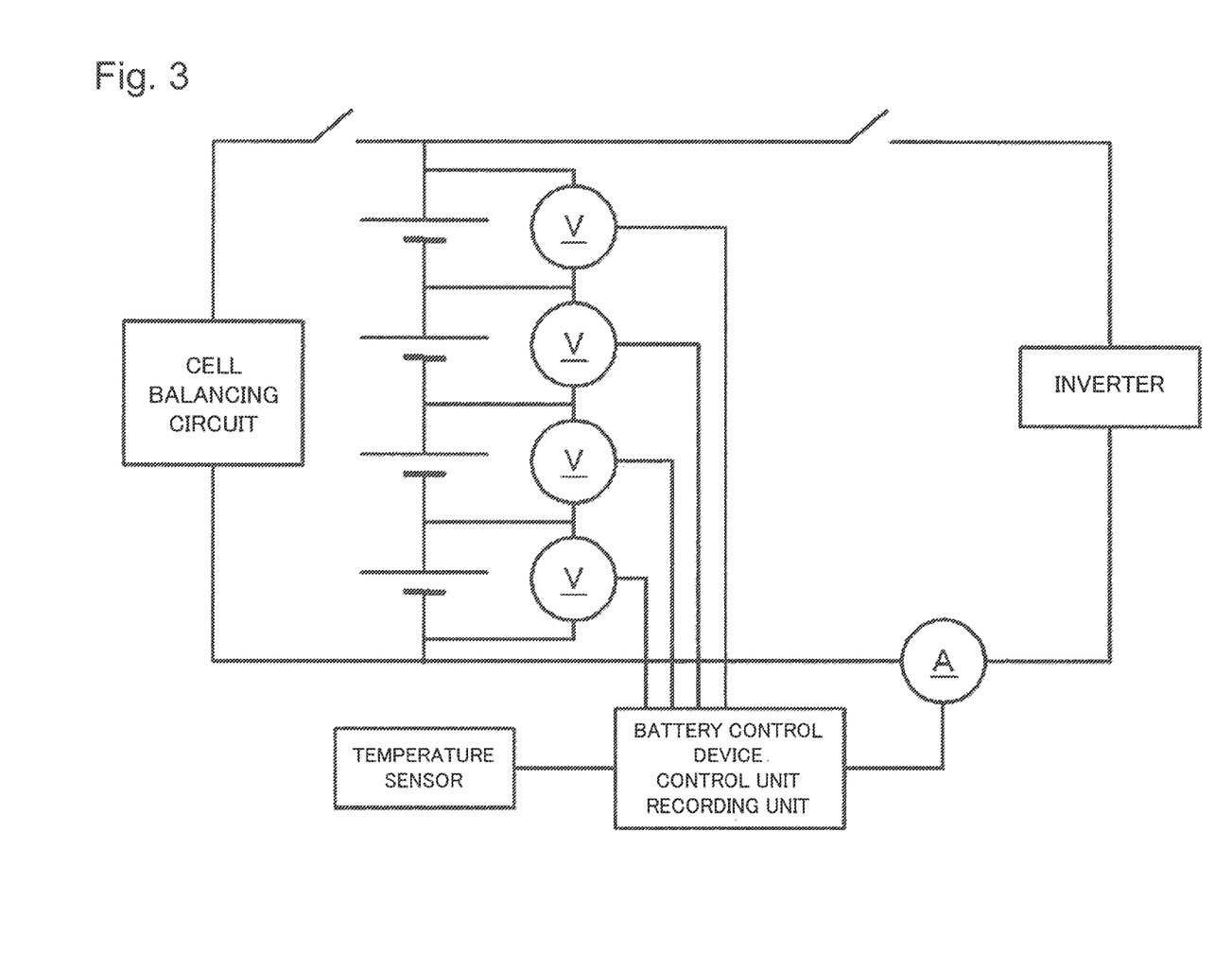
FIG. 3 is a diagram illustrating a circuit diagram of a power storage system used in an example.

A power storage system illustrated by the circuit diagram of FIG. 3 was prepared. The illustrated power storage system includes a battery module, a BMU (Buttery Management Unit), an inverter, a cell balancing circuit, a voltage sensor, a current sensor, a temperature sensor, and switches.

The battery module includes four lithium-ion secondary battery cells connected in series. Specifically, the battery module is configured with use of four cells. Each of laminate cells has a capacity of 33 Ah (constituted of 30 sets of laminates of positive electrode/separator/negative electrode).

A battery control device controls the overall operations of the power storage system (a control unit), and acquires and records measurement data from the voltage sensor, the current sensor, and the temperature sensor (a recording unit).

The voltage sensor is connected to a position at which the charge amount of each of the battery cells is measurable. The voltage sensor can measure the charge amount (charging voltage) of the entirety of the battery module. In the example, the charge amount (charging voltage) of the entirety of the battery module was used as V which represented a degree of discharge from the battery module. The current sensor is connected to a position at which current flowing from the battery module is measurable.

The temperature sensor includes a resistance thermometer mounted in the battery module. In the example, an average temperature of the temperatures of the four cells was used as the temperature T of the battery module.

The battery control device controls to switch ON/OFF of the first switch (the left switch in the drawing). A connected state between the cell balancing circuit and the battery module can be switched by switching ON/OFF of the first switch. While cell balancing is executed, the first switch is kept in an ON state. While cell balancing is not executed, the first switch is kept in an OFF state.

The battery control device controls to switch ON/OFF of the second switch (the right switch in the drawing). A connected state between the battery module and the inverter can be switched by switching ON/OFF of the second switch. While current flows to the inverter (during a discharging), the second switch is kept in an ON state. While current dose not flow to the inverter (during a non-discharging), the second switch is kept in an OFF state. Switching ON/OFF of the first and second switches can be performed by using a relay circuit, for instance.

The cell balancing circuit used an active system. In the active system the cell balance circuit transfers electricity from a high voltage battery cell to a low voltage battery cell via an RC circuit for making uniform of the voltage of the respective battery cells, the RC circuit being a combination of a capacitor and resistor. The value of current which was able to flow between battery cells by the cell balancing circuit was set to be about 0.5 A. In FIG. 3, the battery control device and the cell balancing circuit are illustrated as individual units. Actually, however, the battery control device and the cell balancing circuit are integrated in terms of circuit by a microcomputer or a like device. Further, although not illustrated in detail in FIG. 3, the battery cells are individually connectable to the cell balancing circuit.

Example 1

The power storage system described before was charged until the module voltage reached about 16.2 V at the initial cycle (constant current 10 A–constant voltage 1 A lower limit). Specifically, the value of current was reduced when the voltage approached a predetermined value, and finally, charge was stopped when the current reached 1 A. After the charge was terminated, it was confirmed that there was no anomaly in each cell voltage, and the power storage system started to discharge. The power storage system was operated in a constant current condition of 4 A. In the aforementioned example, a cell balancing operation was not executed in the power storage system. In other words, the power storage system did not execute cell balancing at all.

FIG. 4 illustrates a twice differentiation curve representing a change in the temperature of a battery module with respect to lowering of a charging voltage of the battery module during a discharge operation. The horizontal axis denotes V, and the vertical axis denotes a twice differentiated value of T (V). As discharge progresses, V decreases. Therefore, as discharge progresses, the twice differentiated value of T (V) shifts from right to left in FIG. 4. The illustration of the fluctuation of the twice differentiated value of T (V) between 15.25 V and 16.2 V was omitted because a fluctuation width of the twice differentiated value of T (V) was too large to illustrate by the same scale as the fluctuation illustrated in FIG. 4.

As illustrated in FIG. 4, after discharge start, the twice differentiated value of T (V) greatly changes until the charging voltage of the battery module reaches about 14.4 V, and thereafter, the twice differentiated value of T (V) converges to 0. This is presumably because there is a correlation between temperature rise due to an increase in the internal resistance component, and a reduced amount of potential. The inventors confirmed that the twice differentiated value of T (V) did not converge between 15.25 V and 16.2 V (not illustrated).

Example 2

The power storage system was charged until the module voltage reached about 16.2 V at the initial cycle (constant current 10 A–constant voltage 1 A lower limit). After the charge was terminated, it was confirmed that there was no anomaly in each cell voltage, and the power storage system started to discharge. The power storage system was operated in a constant current condition of 4 A.

In the aforementioned example, a cell balancing operation was executed in the power storage system in response to discharge start. Thereafter, in Example 1, at the point B immediately after the twice differentiated value of T(V) converged (when the charging voltage of the battery module reached about 14.4 V), the cell balancing operation was stopped. After the cell balancing operation was stopped, discharge was continued in a state that the stopped state of the cell balancing operation was continued. In Comparative Example 1, at the point A before the twice differentiated value of T(V) converged (when the charging voltage of the battery module reached about 15 V), the cell balancing operation was stopped. After the cell balancing operation was stopped, discharge was continued in a state that the stopped state of the cell balancing operation was continued. In Comparative Example 2, at the point C after elapse of a predetermined period from the time when the twice differentiated value of T(V) converged (when the charging voltage of the battery module reached about 13.1 V), the cell balancing operation was stopped. After the cell balancing operation was stopped, discharge was continued in a state that the stopped state of the cell balancing operation was continued.

Figure 5:
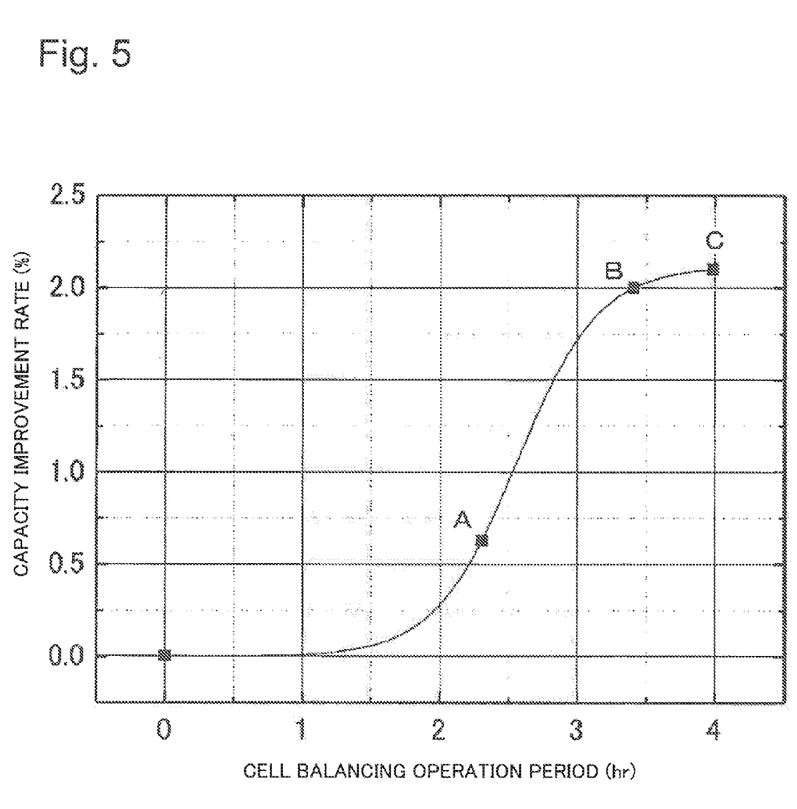
FIG. 5 is a diagram for describing the advantageous effects of the exemplary embodiment.

The obtained result is illustrated in FIG. 1 and FIG. 5. The horizontal axis in FIG. 5 denotes a cell balancing operation period. Among the data plotted in FIG. 5, data indicated as A is data of Comparative Example 1, data indicated as B is data of Example 1, and data indicated as C is data of Comparative Example 2. The vertical axis indicates an improvement rate of the effective capacity, which is implemented by executing a cell balancing operation.

TABLE 1

Improvement rate of effective capacity by cell balancing

|  | Comparative Example 1 | Example 1 | Comparative Example 2 |
|---|---|---|---|
| Improvement rate of capacity | 0.58% | 2.00% | 2.05% |

The improvement rate of the effective capacity by cell balancing was an increase rate of the effective capacity in the cases of executing cell balancing in the aforementioned condition relative to the cases of not executing the cell balancing operation.

The effective capacity of each of Example 1, Comparative Example 1, Comparative Example 2, and a case in which a cell balancing operation was not executed at all was calculated by an equation: voltage×current×discharge period. As a result of calculation, the effective capacity of a case where a cell balancing operation was not executed at all was 240.1 Wh, the effective capacity of Example 1 was 244.9 Wh, the effective capacity of Comparative Example 1 was 241.5 Wh, and the effective capacity of Comparative Example 2 was 245.0 Wh.

As illustrated in FIG. 5, it is clear that in Example 1 (B) and Comparative Example 2 (C) in which a cell balancing operation was executed after discharge start and until the capacity improvement rate reached the point B (until the twice differentiated value of T (V) converged to 0), the effective capacity was remarkably increased by cell balancing (the improvement rate of Example 1: 2.00%, the improvement rate of Comparative Example 2: 2.05%). On the other hand, in Comparative Example 1 (A) in which a cell balancing operation was stopped before the capacity improvement rate reached the point B, the effective capacity improvement rate by cell balancing was as low as 0.58%.

The result clearly illustrates that the improvement rate of the effective capacity by cell balancing was considerably low when a cell balancing operation was stopped before a twice differentiated value of T (V) converged to 0, as compared with a case in which a cell balancing operation was executed until a twice differentiated value of T (V) converged to 0.

Further, FIG. 5 and Table 1 clearly illustrate that the improvement rates of the effective capacity by cell balancing in Example 1 and Comparative Example 2 were substantially the same. Specifically, it is clear that after the capacity improvement rate reached the point B (after the twice differentiated value of T (V) converged to 0); the improvement rate of the effective capacity by cell balancing was not significantly improved regardless of continuation of the cell balancing operation.

The consumed power by executing a cell balancing operation in Example 1 was 1.0 Wh, and the consumed power by executing a cell balancing operation in Comparative Example 2 was 1.2 Wh. The consumed power was calculated on the basis of an equation: power required for control circuit×time.

In Example 1, the effective capacity obtained by executing a cell balancing operation was 4.8 Wh. However, the power consumed by executing the cell balancing operation was 1.0 Wh. Therefore, the actual effective capacity was 3.8 Wh. Likewise, in Comparative Example 2, the effective capacity obtained by executing a cell balancing operation was 4. 9 Wh. However, the power consumed by executing the cell balancing operation was 1.2 Wh. Therefore, the actual effective capacity was 3.7 Wh. In Comparative Example 1, the effective capacity obtained by executing a cell balancing operation was 1.4 Wh. However, the power consumed by executing the cell balancing operation was 0.7 Wh. Therefore, the actual effective capacity was 0.7 Wh.

As described above, Example 1 improves in the effective capacity, as compared with Comparative Example 1 and Comparative Example 2. Thus, the effective capacity of a battery can be increased by switching ON/OFF of a cell balancing operation as described in the Example 1 and Example 2. Thus, the efficiency of a cell balancing function can be enhanced by using a control method of switching ON/OFF of a cell balancing operation on the basis of a point at which a vibrating structure of a differentiation curve of voltage versus temperature converges.

Example 3

Next, in order to verify that the aforementioned advantageous effects are obtained regardless of a change in an operation environment and a deteriorated state, the same measurement as performed in Example 1 was performed at a first charging and discharging cycle (initial cycle), and after 150 cycles.

Figure 6:
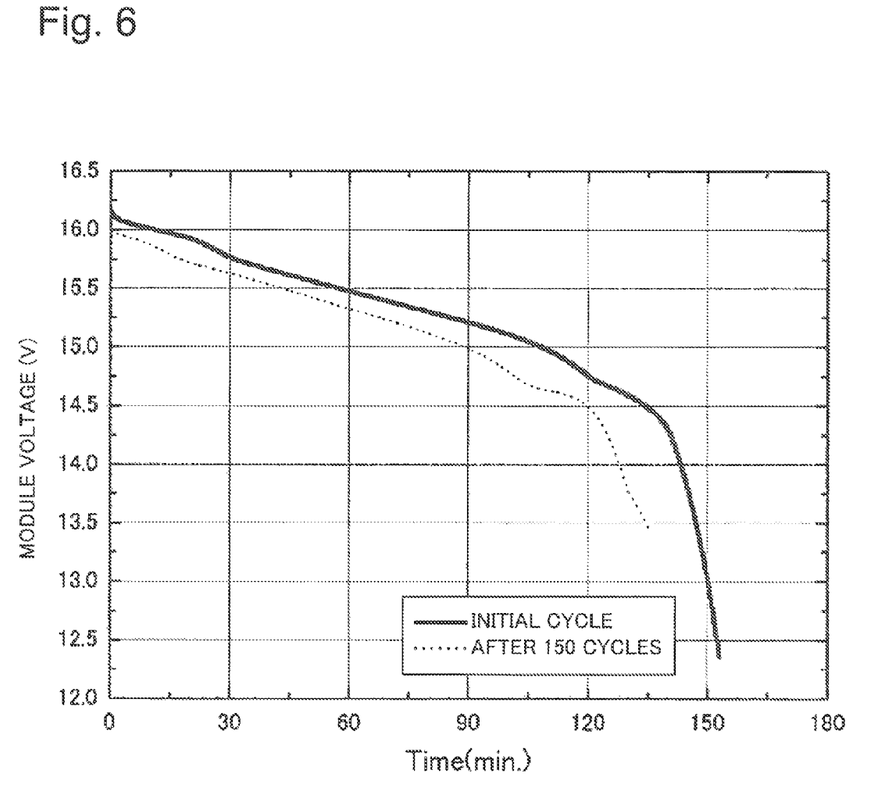
FIG. 6 is a diagram for describing the advantageous effects of the exemplary embodiment.
Figure 7:
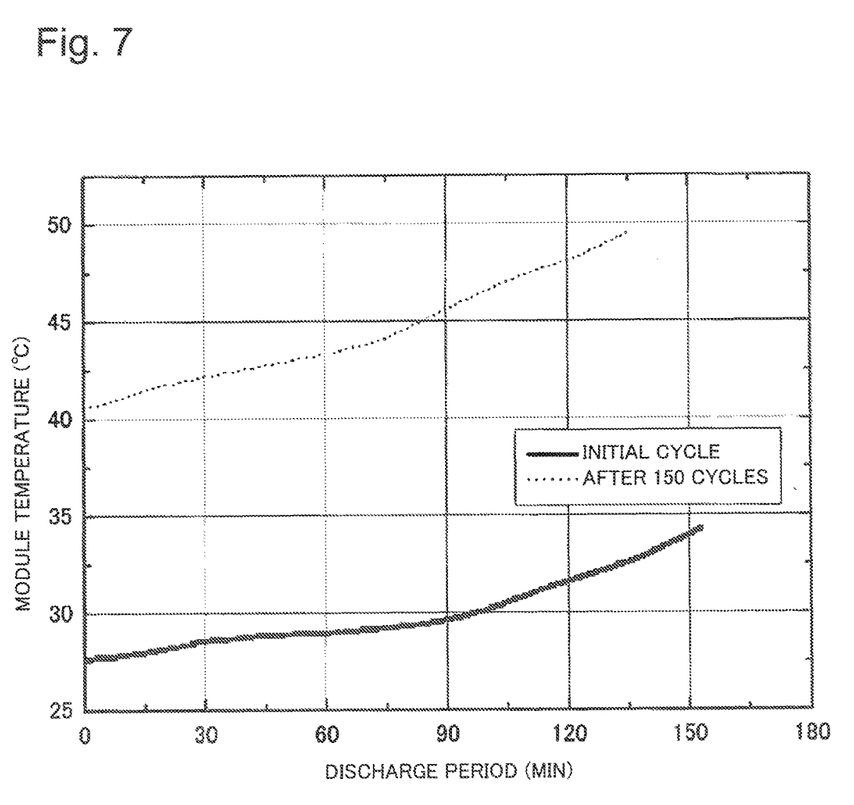
FIG. 7 is a diagram for describing the advantageous effects of the exemplary embodiment.

FIG. 6 and FIG. 7 respectively illustrate a discharge curve and a temperature curve of a battery module at the initial cycle and of the battery module after 150 cycles with respect to an elapsed time from discharge start. In FIG. 6 and FIG. 7, the horizontal axis denotes an elapsed time from discharge start. In FIG. 6, the vertical axis denotes a charging voltage (V) of a battery module. In FIG. 7, the vertical axis denotes a temperature T of a battery module. As is clear from FIG. 6, the capacity was lowered by about 10% after 150 cycles, as compared with the initial cycle. Further, as is clear from FIG. 7, the module temperature was increased by 10° C. or more after 150 cycles, as compared with the initial cycle. This is presumably due to an increase in the internal resistance.

FIG. 8 illustrates a twice differentiation curve representing a change in the temperature of a battery module with respect to lowering of a charging voltage of the battery module calculated on the basis of the data illustrated in FIG. 6 and FIG. 7. The graph employs the same technique as employed in FIG. 4.

The behavior of a twice differentiated value of T (V) until the twice differentiated value of T (V) converges differs between FIG. 4 and FIG. 8. However, the behavior was the same between FIG. 4 and FIG. 8 in that the twice differentiated value of T (V) changed after discharge start and converged at certain timing. Further, the timing at which the twice differentiated value of T (V) converged was substantially the same (about 14.4 to 14.5 V). This reveals that a correlation between a cell voltage and a temperature having a certain inflection point is established regardless of a deteriorated state of a battery.

Example 4

The power storage system described in Example 3 after 150 cycles was charged until the module voltage reached about 16.2 V at the initial cycle (constant current 10 A–constant voltage 1 A lower limit).

After the charge was terminated, it was confirmed that there was no anomaly in each cell voltage, and the power storage system started to discharge. Then, the power storage system was operated in a constant current condition of 4 A.

In the aforementioned example, a cell balancing operation was executed in the power storage system in response to discharge start. Thereafter, the cell balancing operation was stopped at a point immediately after the twice differentiated value of T(V) converged (when the charging voltage of the battery module reached about 14.5 V), and discharge was continued in a state that the stopped state of the cell balancing operation was continued (Example 2).

Table 2 illustrates an improvement rate of the effective capacity calculated in the same manner as Example 2. The improvement rate after 150 cycles was about 1%.

TABLE 2

| Improvement rate of effective capacity by cell balancing | |
|---|---|
| | Example 2 |
| Improvement rate of capacity | 1.1% |

As described above, there is a strong correlation between a cell voltage and a temperature at the time of discharge from a lithium-ion secondary battery. The correlation is established regardless of an operation temperature and the number of cycles, which may greatly affect a deteriorated state of a battery. Further, the index is also correlated to the efficiency of a cell balancing function. Using the index as a judgment index of a control circuit for cell balancing is advantageous in enhancing the efficiency regardless of the operation environment.

Example 5

The power storage system described before was charged until the module voltage reached about 16.2 V at the initial cycle (constant current 10 A–constant voltage 1 A lower limit) After the charge was terminated, it was confirmed that there was no anomaly in each of the cell voltages, and the power storage system started to discharge. Then, the power storage system was operated in a constant current condition of 4 A.

In the aforementioned example, in the power storage system, a cell balancing operation was not executed immediately after discharge start, a cell balancing operation was started at the point B immediately after the twice differentiated value of T (V) converged (when the charging voltage of the battery module reached about 14.4 V), and thereafter, discharge was continued in a state that the cell balancing operation was executed (Comparative Example 3).

The effective capacity improvement rate of Comparative Example 3 was 0.04%. In Comparative Example 3, the period when a cell balancing operation was executed was 75 minutes, and the effective capacity obtained by executing the cell balancing operation was 0.1 Wh. This reveals that the average improvement rate of the effective capacity by executing a cell balancing operation after a twice differentiated value of T (V) converged was about 0.001 Why/min. On the other hand, the consumption rate of power by executing a cell balancing operation (the reduction rate of the effective capacity) was about 0.005 Wh/min. This reveals that the effective capacity increases by not executing a cell balancing operation after a twice differentiated value of T (V) converges.

The following is an example of a reference embodiment.

1. A power storage system comprising:
    a battery means in which a plurality of battery cells are connected;
    an acquisition means which acquires, while discharging the battery means, V representing a degree of discharge from the battery means, and a temperature T of the battery means at the time when the degree of discharge is V;
    a balancing means which executes cell balancing for reducing a difference in a charge amount between the battery cells; and
    a balancing control means which controls the balancing means not to execute the cell balancing in response to detection of a reference state on the basis of the V and the T.

2. The power storage system according to 1, wherein
    the balancing control means controls the balancing means not to execute the cell balancing in response to detection of a state that a twice differentiated value of T (V) satisfies a predetermined condition after discharge from the battery means is started, T (V) being a function of the V to be calculated by using the V and the T acquired by the acquisition means.

3. The power storage system according to 2, wherein
    the predetermined condition is converging an absolute value of the twice differentiated value of T (V) to a predetermined value or smaller.

4. The power storage system according to any one of 1 to 3, wherein
    the balancing means starts execution of the cell balancing at a predetermined timing after discharge from the battery means is started, and stops execution of the cell balancing in accordance with control by the balancing control means.

5. The power storage system according to any one of 1 to 4, wherein
    the balancing means executes active cell balancing.

6. A method for controlling a storage battery, the method causing a computer to execute:
    an acquisition step of acquiring, while discharging the battery means, V representing a degree of discharge from a battery means, and a temperature T of the battery means at the time when the degree of discharge is V, the battery means being configured such that the plurality of battery cells are connected;
    a balancing step of executing cell balancing of reducing a difference in a charge amount between the battery cells; and
    a balancing control step of controlling the balancing step not to execute the cell balancing in response to detection of a reference state on the basis of the V and the T.

6-2. The method for controlling a storage battery according to 6, wherein
    in the balancing control step, the balancing step is controlled not to execute the cell balancing in response to detection of a state that a twice differentiated value of T (V) satisfies a certain condition after discharge from the storage battery is started, T (V) being a function of the V to be calculated by using the V and the T acquired in the acquisition step.

6-3. The method for controlling a storage battery according to 6-2, wherein the certain condition is converging an absolute value of the twice differentiated value of T(V) to a reference value or smaller.

6-4. The method for controlling a storage battery according to any one of 6 to 6-3, wherein in the balancing step, cell balancing is started the at a certain timing after discharge from the battery means is started, and stops the cell balancing in accordance with control by the balancing control means.

6-5. The method for controlling a storage battery according to any one of 6 to 6-4, wherein active cell balancing is executed in the balancing step.

7. A program which causes a computer to function as:

an acquisition means which acquires, while discharging the battery means, V representing a degree of discharge from a battery means, and a temperature T of the battery means at the time when the degree of discharge is V, the battery means being configured such that the plurality of battery cells are connected;

a balancing means which executes cell balancing of reducing a difference in a charge amount between the battery cells; and a balancing control means which controls the balancing means not to execute the cell balancing in response to detection of a reference state on the basis of the V and the T.

7-2. The program according to 7, wherein the balancing control means controls the balancing means not to execute the cell balancing in response to detection of a state that a twice differentiated value of T (V) satisfies a predetermined condition after discharge from the battery means is started, T (V) being a function of the V to be calculated by using the V and the T acquired by the acquisition means.

7-3. The program according to 7-2, wherein the predetermined condition is converging an absolute value of the twice differentiated value of T(V) to a predetermined value or smaller.

7-4. The program according to any one of 7 to 7-3, wherein the balancing means starts execution of the cell balancing at a predetermined timing after discharge from the battery means is started, and stops execution of the cell balancing in accordance with control by the balancing control means.

7-5. The program according to any one of 7 to 7-4, wherein the balancing means executes active cell balancing.

This application claims the priority based on Japanese Patent Application No. 2013-177236 filed on Aug. 28, 2013, and all of the disclosure of which is hereby incorporated.

The invention claimed is:

1. A power storage system comprising:

a battery module which includes a plurality of battery cells connected to each other, a voltage sensor which measures voltage of the battery module and voltages of the battery cells, a temperature sensor which measures temperature of the battery module, a cell balance circuit which executes cell balancing for reducing voltage difference between the battery cells, and a battery control device which switches operation mode from first mode to second mode in cases when the voltage of the battery module in a discharge operation is at a certain voltage, wherein in the first mode, the cell balance circuit is executed in cases when the voltage difference between the battery cells is larger than a reference value in the discharge operation, and in the second mode, the cell balance circuit is not executed in cases when the voltage difference between the battery cells in the discharge operation is larger than the reference value.

2. The power storage system according to claim 1 wherein the certain voltage is a value at which the voltage of the battery module in a discharge operation is when a differentiated value of a function satisfies a condition, the function being calculated by using the voltage of the battery module and the temperature of the battery module.

3. The power storage system according to claim 2 wherein the condition under which the differentiated value of the function is satisfied is a condition under which the differentiated value does not change any longer and an absolute value of the twice differentiated value of the function converges to a certain value or smaller.

4. The power storage system according to claim 1, wherein the cell balance circuit executes an active cell balancing.

5. A method for controlling a power storage system which has a battery module including a plurality of battery cells connected to each other, the method comprising:

a step for measuring voltage of the battery module and voltages of the battery cells, a step for measuring temperature of the battery module, a step for controlling cell balancing for reducing voltage difference between the battery cells in cases when the voltage difference between the battery cells in a discharge operation is larger than a reference value, and a step for controlling the step for controlling cell balancing not to execute in cases when the voltage of the battery module is at a certain voltage.

6. The method for controlling the power storage system according to claim 5, wherein the certain voltage is a value at which the voltage of the battery module in a discharge operation is when a differentiated value of a function satisfies a condition, the function being calculated by using the voltage of the battery module and the temperature of the battery module.

* * * * *